United States Patent [19]

Rule et al.

[11] 4,232,050

[45] Nov. 4, 1980

[54] IMITATION ACID-SET CHEESE

[75] Inventors: Charles E. Rule, Lakewood; Robert G. Manning; Richard J. Zielinski, both of Middleburg Hts., all of Ohio

[73] Assignee: SCM Corporation, N.Y.

[21] Appl. No.: 820,302

[22] Filed: Jul. 29, 1977

[51] Int. Cl.$^3$ .............................................. A23C 19/02
[52] U.S. Cl. ..................................................... 426/582
[58] Field of Search .......................... 426/36, 582, 583

[56] References Cited

U.S. PATENT DOCUMENTS

| | | | |
|---|---|---|---|
| 3,397,995 | 8/1968 | Elenbogen | 426/582 X |
| 3,922,374 | 11/1975 | Bell et al. | 426/582 |
| 4,075,360 | 2/1978 | Rule et al. | 426/582 |
| 4,110,484 | 8/1978 | Rule et al. | 426/582 |

FOREIGN PATENT DOCUMENTS 952761 8/1974 Canada.
2058207 6/1971 Fed. Rep. of Germany.

OTHER PUBLICATIONS

Petromski, G. E., Food Grade Emulsifiers–Part II, Food Technology, Jul. 1976, pp. 36-40.
Kogikowski, F., Cheese and Fermented Milk Foods, published by the Author, Cornell University, Ithaca, N.Y., 1966, pp. 155 & 156.

*Primary Examiner*—David M. Naff
*Attorney, Agent, or Firm*—Richard H. Thomas

[57] ABSTRACT

An improved imitation acid-set cheese product, prepared from a formulation containing a hydrogenated vegetable oil, an edible protein, a calcium containing salt such as calcium chloride, and edible acid such as lactic acid, flavoring and color, can be obtained by adding to the formulation an organic emulsifier which is fluid at ambient temperature and has an HLB value of more than about 10. Preferred emulsifiers are polyglycerol esters of fatty acids such as octaglycerol monooleate, polysorbates such as polyoxyethylene (20) sorbitan monostearate. ethoxylated mono- and diglycerides such as polyoxyethylene (20) mono- and diglycerides of fatty acids and sugar esters.

6 Claims, No Drawings

IMITATION ACID-SET CHEESE

The present invention relates to a novel process and formulation for the preparation of an improved imitation acid-set cheese product. The present invention will be described with reference to the preparation of a mozzarella cheese, but it will be apparent to those skilled in the art that the present invention has broader application, for instance the preparation of such cheeses as cheddar, Cheshire, brick, colby, muenster, Romano, parmesan, American, and Swiss cheeses, characterizable as hard cheeses.

For purposes of the present application, an imitation cheese product is defined as one having non-dairy protein and lipid systems, sodium caseinate being considered a non-dairy ingredient. By acid-set, it is meant that process in which an edible acidulant is added directly to a mixture of the cheese-making ingredients as a substitute for the acid provided by a natural culture process. The acidulant can be any edible acid.

BACKGROUND OF THE INVENTION

Filled and imitation cheese products using a vegetable fat in place of butterfat are well-known. Several major factors have influenced their greater acceptance. For one, a vegetable fat is less expensive than its butterfat counterpart. Another factor has been technical improvements in the filled and imitation products and components employed in their manufacture. For instance, functional lipid systems capable of meeting almost any specification are now available.

A truly imitation cheese offers several further advantages over a filled product. Its manufacture avoids the need for maintaining acid-producing micro-organisms conventionally employed in the cheese-making process. Also avoided are the formation of whey as a by-product and the accompanying need for separation and disposal of the same. In addition, the process for the production of an imitation cheese can be semi-continuous or continuous whereas processes for production of natural and filled cheeses of necessity are carried out on a batch basis.

From a nutritional point of view, the filled and imitation products may be of the same quality as their corresponding natural products.

Whereas a large number of filled cheese products exist on the market today, those truly imitation cheese products which have been developed have been more in the nature of soft cheeses, imitation sour creams or sour cream whips, cream cheeses and cottage cheeses. One such product is described in the Elenbogen U.S. Pat. No. 3,397,995 and is characterized as a cream cheese spread. In this patent, lactic acid is incorporated directly into a composition comprising about 15 to 40 percent by weight fat having a ratio of polyunsaturated to saturated fats in the range of about 3:1 to about 9:1, the composition also having about 5 to 15% of a phosphoprotein solid, such as an alkali caseinate, and an amount of a stabilizing vegetable gum, the remainder being water. The patent discloses that optionally an amount of an emulsifier such as a mono- and diglyceride or sorbitan ester of a fatty acid may be used.

One problem experienced with the manufacture of acid-set cheese is the production of an uneven product of varying quality. For instance the Little U.S. Pat. Nos. 3,378,375 and 3,792,171, state that the acid overacidifies portions of the casein-containing product causing premature precipitation of these portions while other portions which are the last to be acidified form a large, hard, coarse curd. By comparison, when bacteria cultures are employed, the acid is formed slowly, uniformly and in situ so that the acidity of the milk product lowers slowly and uniformly. It is stated that even when concentrated acids are added slowly and under proper conditions of temperature and mixing, a consistently uniform product is difficult to obtain. Applicants' own observation is that separation of oil from the formed product, referred to as oiling-off, can readily occur at the end of mixing in the acid-set manufacture of imitation cheese.

With regard to mozzarella cheese and other harder cheeses, those new products which have been developed can be more readily categorized as filled cheeses. Prior U.S. Pat. No. 3,579,354 to Kasik et al describes an elastic cheese product which is useful as a substitute for mozzarella cheese prepared from an aqueous dispersion comprising 1 to 15% sodium caseinate and up to 30% butterfat. The fat sodium caseinate mixture is innoculated with a starter and then is further innoculated with micrococci and allowed to ferment aerobically until the system becomes elastic and plastic in consistency. Acidification then takes place to coagulate the product, the acidification being to a pH of about 5.2 to about 3.2.

The product of the patent is not a true imitation product, and is unduly expensive because of the large amount of butterfat employed. The product also suffers from the disadvantages normally associated with processing of a natural product.

U.S. Pat. No. 3,922,374, issued to Bell et al, discloses a non-dairy imitation cheese resembling pasta filata, cheddar and pasteurized process American-type cheeses. The cheese is made by the in-situ forming of calcium or sodium caseinate in a formulation containing water, acid and casein hydrochloride, to which sodium hydroxide to calcium hydroxide is added. Fat is added to the formulation plus other ingredients. The final product contains sufficient acid to achieve a product pH typical for processed imitation or filled products, of about 5.1. It is stated in the patent that sodium caseinate is unsatisfactory as the protein in imitation mozzarella cheese exposed to severe high temperature conditions (such as on a pizza). The reason given is that an imitation cheese using sodium caseinate instead of calcium caseinate tends to burn and puff when exposed to high heat. Examples in the patent which relate to the preparation of a mozzarella-type cheese employ only calcium caseinate, formed in situ. The patent describes the use of certain inorganic salts, such as disodium phosphate and sodium aluminum phosphate, referred to as emulsifying salts, but only in cheddar and pasteurized process American cheeses. The examples for mozzarella cheese do not employ such salts.

U.S. Pat. No. 2,148,593, Teller et al, also describes the conventional practice in the cheese art of employing an emulsifying salt in the cheese processing steps; for the expressed purpose of preventing separation of casein and fat constituents. No mention is made of mozzarella cheese or organic emulsifiers.

In this regard, mozzarella cheese is a different cheese. It can be characterized as a fresh, high moisture cheese having a relatively bland flavor. The cheese is rubbery in nature, that is, provided with a high degree of stretch, is hard so that it can be grated into flakes, and browns when cooked. It is frequently combined with other foods, for instance, tomato sauce in the preparation of pizza, and in this regard should have good melt-down characteristics providing a continuous fused layer when baked. Further, the cheese should be firm, versus soft, and smooth in texture. Reference can be had to prior U.S. Pat. Nos. 3,531,297 and 3,692,540 for a further description, incorporated by reference herein, of properties desired of pasta filata cheeses.

Prior copending application Ser. No. 752,260 now U.S. Pat. No. 4,075,360 describes an improved mozzarella-type cheese which is obtained by employing as the basic ingredients about 15-35% of a caseinate of which at least 70% is sodium caseinate, about 15-30% of a low melting point hydrogenated vegetable oil, a small amount of a calcium containing salt such as calcium chloride, and an amount of an edible acid, preferably lactic acid, the remainder being water (about 45%) and small amounts of flavor, preservative and other ingredients. A critical feature of the prior application lay in the use of at least about 70% sodium caseinate, as the caseinate component; sufficient acid to provide a final pH of the product of about 5 to 6; and a calcium ion containing salt.

Sodium caseinate offers the advantage, over calcium caseinate, that it provides a higher degree of stretch, a characteristic of mozzarella cheese. However, as disclosed in the Bell et al U.S. Pat. No. 3,922,374, the use of sodium caseinate as the protein tends to cause burning and puffing when the imitation cheese is used on pizzas. It is suggested that by contrast the use of calcium caseinate does not cause such burning and puffing. It is surmised that the use of calcium caseinate probably causes the formation of a discontinuous surface which allows vapors to escape. Although this is better from the point of view of puffing and burning, the calcium containing product, being less rubbery or stretchy, does not make as good a mozzarella cheese for such applications as pizzas.

The advance of said copending application resided in the discovery that by limiting the acid content of the product formulation, and employing a calcium containing salt in the formulation, the melt-down properties of the cheese were improved to reduce the formation of large bubbles and burning during cooking. At the same time, the desired stretch properties characteristic of a mozzarella cheese were retained.

For purposes of the present application, a mozzarella-type cheese formulation shall mean any formulation for the manufacture of an imitation pasta filata cheese.

The disclosure of the prior application Ser. No. 752,260 is incorporated by reference herein.

SUMMARY OF THE INVENTION

It has now been discovered, in accordance with the concepts of the present invention, that an improved hard imitation, acid-set cheese product, manufactured from a formulation containing a hydrogenated vegetable oil, an edible protein of which a portion preferably is sodium caseinate, a calcium containing salt, an edible acid, flavoring and color, can be obtained by incorporating into the formulation an organic emulsifier which is fluid at ambient temperature and has an HLB value of more than about 10. Preferred emulsifiers are polyglycerol esters of fatty acids, polysorbates, ethoxylated mono- and diglycerides and sugar esters which have high HLB values (more than about 10) and are fluid at ambient temperature.

By the present invention, improved workability in manufacture of the cheese product is obtained. The organic emulsifying agent of the present invention provides a dramatic decrease in viscosity during processing as compared with imitation cheese without such emulsifying agent. In addition, better mixing is obtained thereby providing a uniform product free of oiling-off, or oil separation during manufacture or baking for instance on a pizza pie.

A particular embodiment of the present invention resides in the discovery that the organic emulsifying agent dramatically enhances melt-down characteristics of pasta filata (mozzarella) type cheese preventing puffing and burning of the cheese on cooking. Improved appearance and stretch of the cheese product also result with use of the organic emulsifying agent of the present invention.

For purposes of the present application, the term "fluid" defines a pasta consistency, which is pourable, at ambient temperature, as well as a product which is liquid at ambient temperature. The term "hard" defining the cheese shall mean such cheeses as mozzarella, cheddar, Cheshire, brick, colby, muenster, Romano, parmesan, American and Swiss sufficiently hard to be grated. By "high moisture", it is meant having a moisture content of about 45-53% by weight, based on the entire weight of the cheese formulation.

A benefit resulting from decreased viscosity during processing, as compared with imitation cheese formulations without the emulsifying agent of the present invention, is that a large number of pieces of equipment can be used providing a versatility not heretofore known. For instance, a very satisfactory mozzarella cheese can be prepared employing an ordinary cheese cooker. Alternatively, the cheese can be prepared in heavy duty continuous processing equipment, such as described in copending application Ser. No. 721,972, filed Sept. 10, 1976, now U.S. Pat. No. 4,110,484, assigned to assignee of the present application.

DETAILED DESCRIPTION OF THE INVENTION

The basic ingredients of the improved mozzarella cheese of the present invention comprise about 15-35% of an edible protein, of which at least 40% preferably is sodium caseinate, about 15-30% of a low melting point hydrogenated vegetable oil, a small amount of a calcium containing salt such as calcium chloride, a sufficient amount of an edible acid, preferably lactic acid, to attain a product pH of about 4.5 to 6, preferably about 5.2-5.8, and an emulsifying agent, which, as indicated, is fluid at ambient temperature and has an HLB value of at least about 10. Preferably the emulsifying agent has an HLB value of about 13-16. The remainder of the formulation is water (about 45-53%) and small amounts of flavor preservative and other ingredients.

Whereas a large number of emulsifiers are available on the market today and are approved for food uses, it was discovered surprisingly that only a limited number of emulsifiers were operable, and also that there was no particular pattern as to which emulsifiers were operable and which were not, except that those that were operable consistently had high HLB values (more than about 10) and were fluid at ambient temperature.

The class of ethoxylated fatty acid esters useful in the present invention are the ethoxylated fatty acid esters of glycerol, hexitol, hexitan and isohexide, as well as the fatty acid esters of ethoxylated glycerol, hexitol, hexitan and isohexide.

A preferred class of compounds for use in the concentrate of the present invention are the ethoxylated mono- and diglycerides, which are the polyethoxylated fatty acid esters of glycerol, and may be conventionally described as a mixture of stearate, palmitate, and lesser amounts of myristate partial esters of glycerin condensed with about 18 to 22 moles, preferably about 20 moles, of ethylene oxide per mole of alpha-monoglyceride reaction mixture such as set forth in The Food Codex and FDA Regulations, and more particularly as set forth in the Egan patent, U.S. Pat. No. 3,433,645, incorporated herein by reference. The fatty acid radicals of ethoxylated monoglycerides broadly are higher fatty acid chains having about 12 to 18 carbon atoms.

One suitable ethoxylated mono- and diglyceride that may be employed in the present invention is Durfax-EOM (Trademark) marketed by Durkee Foods Division of SCM Corporation. This emulsifier is manufactured from hydrogenated vegetable oils and has an HLB value of about 13, is fluid at ambient temperature, has an acid value maximum of 2.0, an hydroxyl value of 60–80, a saponification value of 65–75 and an oxyethylene content of 60.5–65.0%.

Other ethoxylated fatty acid esters which may be employed in the present invention are the polysorbates, such as polyoxyethylene (20) sorbitan monostearate (polysorbate 60) or polyoxyethylene (20) sorbitan monooleate (polysorbate 80). These emulsifiers are sold under the trademarks "Durfax 60" and "Durfax 80", respectively, by Durkee Foods Division of SCM Corporation. They have an HLB value of about 13–15 and are fluid at ambient temperature.

Ethoxylated monoglycerides may be prepared by reacting ethylene oxide with a mono- and diglyceride mixture at temperatures of about 125° to 175° C., such as suggested in the Egan patent, U.S. Pat. No. 3,490,918, and incorporated herein by reference. Similar known procedures are available for the preparation of the polysorbates.

Another preferred class of compounds for use in the formulation of the present invention is the polyglycerol esters. These esters are generally a mixture of unsaturated and saturated fatty acid esters of a mixture of polyglycerols in which the range of polyglycerol is from diglycerol to tridecaglycerol. The unsaturated and saturated fatty acids generally contain 16 to 18 carbon atoms and are typically derived from corn oil, cottonseed oil, lard, palm oil, peanut oil, safflower oil, sesame oil, soybean oil, tallow, and tall oil and the fatty acids derived from these substances either hydrogenated or unhydrogenated. The polyglycerol mixture is prepared by the polymerization of glycerol with an alkaline catalyst as exemplified in U.S. Pat. No. 3,637,774, or an acid catalyst as exemplified in U.S. Pat. No. 3,968,169. The range of possible polyglycerol esters is quite large and can range from a monoesterified diglycerol to a dodecaesterified decaglycerol, with the iodine value of the fatty acid ranging from 0 to 90.

A particularly suitable polyglycerol ester of fatty acids useful in the process of the present invention is octaglycerol monooleate (8-1-0). This compound has a calculated HLB value of about 13–16, and also is of fluid consistency at ambient temperature. Polyglycerol esters are obtained by polymerizing glycerol and then esterifying them by reaction with fatty acids in a direct esterification or by reaction with fats and oils in an interesterification process. Suitable polyglycerol esters broadly have a hydroxyl value of about 400 to 600, a saponification number of about 60 to 100, and acid values of less than about 10. Octaglycerol monooleate typically contains about 60–68% oleic acid and has a hydroxyl number of 500–570, a saponification number of 68–85 and an acid number of under 4.1.

The sugar esters and processes for making them are disclosed in a number of prior patents including the Sugar Research Foundation, Inc. patents to Hass, U.S. Pat. Nos. 2,893,990 and 2,970,142; the State of Nebraska patents to Osipow et al, Nos. 3,480,616 and 3,644,333; and Dai-Ichikogyo Seiyaku Co., Ltd. patent No. 3,792,041. One particularly suitable sugar ester is OW-1570 TM manufactured by Ryoto Company of Japan. This emulsifier can be characterized as sucrose monooleate with 70% monoester. It has a fatty acid composition of approximately 60% oleic acid, and is fluid with a 60% water content. Its HLB value is about 15.

Whereas at least about 40% sodium caseinate provides a stretch quality in the finished product approximating that of natural mozzarella cheese, a blend of about 80% sodium caseinate and about 20% calcium caseinate is preferred providing an optimum balance between stretch and browning in the final product. Preferably, the caseinate (protein) portion is about 22–25% of the total weight of the cheese composition. Instead of calcium caseinate, other protein systems can be used with sodium caseinate, for example, a vegetable protein such as soy protein, peanut protein, and cottonseed protein, and a single cell protein such as torula yeast, marketed under the Trademark "Torutein" by Amoco Foods Company. Alternatively the protein component can be 100% sodium caseinate. The particular type or brand of sodium caseinate is not critical, and many sodium caseinates and blends thereof are available on the market which can be employed. As a still further alternative, the caseinate can be formed in-situ as set forth in the prior Bell et al U.S. Pat. No. 3,922,374 mentioned above. This portion of the disclosure of the Bell et al patent is incorporated by reference herein.

The particular vegetable oil employed is not critical. Preferably, it has a melting point close to or higher than body temperature, and should have good stability and a bland flavor. A number of hydrogenated cottonseed and soybean oils have been found to be satisfactory.

A suitable fat is a hydrogenated cottonseed oil having a Wiley Melting Point of about 104.6° F., an Iodine Value of about 63.0 (calculated), and SFI (Solids Fat Index) as follows:

50° F.—46.9
  70° F.—33.8
  80° F.—28.2
  92° F.—14.2
  100° F.—4.8
  110° F.—0.0

Advantages in the use of this fat are its availability and relatively low cost. The fat is also quite stable, is bland in flavor, works well during processing of the cheese and provides good melting and grating characteristics in the final product.

Another suitable fat is known as "Durkex" 500 (registered trademark, SCM Corporation). This fat also is a fractionated hydrogenated soybean/cottonseed oil mixture, has a relatively low Wiley Melting Point, of only about 63° F., and has a free fatty acid content of about 0.05% (maximum), an Iodine Value of about 74–81, and an SFI (Solids Fat Index) as follows:

50° F.—14-20
70° F.—3 max.

Still a third suitable fat is Code 321 (trademark, SCM Corporation), a hydrogenated soybean oil having a free fatty acid content of about 0.05, a Wiley Melting Point of about 95°-99° F., and SFI as follows:

50° F.—35-41
70° F.—20-26
80° F.—14-20
92° F.—4-8
100° F.—3 max.

Other fats, or oils, such as margarine oils, which are bland in flavor, preferably have a Wiley Melting Point of between about 60° to about 120° F., and preferably are derived from cottonseed oil, soybean oil, palm oil, and corn oil may be employed. A preferred weight of fat or oil in the imitation cheese formulation is about 22-26%.

The particular acid employed is not critical. Very satisfactory results were obtained with 1-3% lactic acid, but it would be suitable to use hydrochloric acid, acetic acid, or Genlac C, the latter being a blend of water, citric acid, lactic acid, acetic acid and artificial flavors. Other acids such as malic, tartaric, glutaric, fumaric and adipic or blends of these acids may also be employed.

The amount of acid employed is critical. The acid should be added until a pH of about 6 to about 4.5 is reached, a preferred pH range being about 5.2-5.8. In this regard, it was found that the amount of acid added tended to control the rate of melting of the cheese during baking (in the preparation of a pizza) and also tended to determine if the product remained white or burned. Too high an acid content (too low a pH) prevented browning, adversely affected the melt-down characteristics of the cheese, and adversely affected stretch qualities. Too low an acid content tended to cause burning and the formation of a crust-like product which was soupy underneath.

In this regard, a pizza is manufactured by grating the cheese onto the surface of the pie after the tomato sauce has been placed on the pie. The pie is inserted in an oven, and at the temperature of the oven, the cheese is melted and fused to produce a uniform, substantially homogeneous surface. The product is considered defective if there is insufficient melt-down at the temperature of the oven and time of cooking to leave distinctive flake shapes on the surfaces of the pie. Certain pizza manufacturers may or may not prefer to have bubbling of the tomato sauce through the cheese layer to the surface.

Burning is believed to take place with the flow of protein to the surface. Soupiness results with oil separation and mixing of the oil with the tomato sauce.

The addition of a calcium ion containing salt or other ionizable, edible, calcium providing substance to the mozzarella cheese composition is preferred. The calcium ion reacts with the protein, improving stretch, browning, and melt-down characteristics. Other ionizable calcium containing substances besides calcium chloride may be employed, such as calcium hydroxide and calcium carbonate, although calcium chloride is a traditionally used additive in the cheese industry. Preferably about 0.8% calcium chloride is added to the cheese composition although this may be varied somewhat, the broad range for this component being about 0.5-1%.

In addition to the above ingredients, flavoring ingredients, color ingredients such as beta-carotene or egg shade, table salt for flavor, potassium sorbate (a preservative) and a vitamin supplement may be employed. The balance of the formulation (about 45-53%) is water.

For purposes of the present application, such ingredients as the vegetable oil, protein, emulsifier, acid, calcium salt and water can be considered active ingredients contributing to the functionality of the final product, in terms of such properties as stretch, browning and melt-down. Other substances such as the flavor and color components, the preservative and vitamin supplement can be considered to be functionally inert substances. Thus, when it is stated that the formulation of the present invention consists essentially of oil, water, protein, emulsifier, acid and calcium providing substance, this is deemed to refer to only the "active" ingredients and does not preclude the addition of small amounts of functionally inert substances.

EXAMPLE 1

The following example illustrates the preparation of a mozzarella cheese suitable for pizza pies, or for other products where a mozzarella cheese is used (proportions are approximate).

|  | % by Weight |
|---|---|
| Durkex 500 (Trademark, SCM Corp.) | 23.5 |
| Polyoxyethylene (20) mono- and diglycerides of fatty acids (Durfax-EOM, Trademark, SCM Corp.) | 0.5 |
| Sodium caseinate | 21.0 |
| Calcium caseinate | 5.3 |
| Calcium chloride | 0.9 |
| Sodium chloride | 0.8 |
| Lactic acid | 0.9 |
| Potassium sorbate | 0.1 |
| Egg shade (coloring) | minor |
| Water | 47.0 |

In addition to the above components, the formulation may also include minor amounts of flavoring and other ingredients.

A homogeneous blend of sodium and calcium caseinates was first prepared. Fifty percent of this blend was added to the lipid ingredients at 140° F., which was agitated maintaining 140° F. until homogeneous. The remainder of the caseinate blend was added to the water mix, which already contained the other ingredients, except the lactic acid. The water mix was also agitated, until homogeneous, with a final temperature of 140° F. Then both mixtures were added rapidly to an auger type steam injected cheese cooker, and the mixture was heated to 160° F. in the cheese cooker. The lactic acid was then added, and the batch was maintained at 160° F. for 15 minutes. At the end of cooking, the cheese was removed from the cooker and transferred to a Moyno pump hooked to a two-stage homogenizer. Homogenization was carried out at 1,000 psi, first stage. This was followed by packaging and storing at 40° F. An example of a suitable cheese cooker is one made by Damon Company, Fond Du Lac, Wisconsin. Suitable homogenizers are made by CherryBurrell Corp., Skokie, Ill., and Crepaco, Chicago, Ill.

Durfax-EOM has an HLB value of about 13 and is fluid at ambient temperature, as mentioned above.

The final product resembled mozzarella cheese in appearance and could be grated and sliced similar to such cheese. Baked on pizza pie at 425°, for 16 minutes, it had a color similar to mozzarella cheese, melt properties similar to mozzarella cheese and a stretch equal to about 30–50% of that of natural mozzarella cheese. It equalled natural mozzarella cheese in texture, and exhibited only slight oiling-off during baking. Also, the cheese formulation exhibited a dramatic decrease in viscosity during processing as compared with imitation cheese without an emulsifier component, permitting its manufacture in an ordinary cheese cooker. Increasing the emulsifier content (EOM) to about 1.0%, proportionately decreasing the water content, resulted in an even further improved product having no oiling-off during baking. Despite the lower water content, a dramatic decrease in viscosity was noted during processing, compared to a cheese formulation without emulsifier.

EXAMPLE 2

The formulations and manufacturing procedure of Example 1 were employed except that the emulsifier used was octaglycerol monooleate, at both the 0.5 and 1.0% levels (approximate). Octaglycerol monooleate, a polyglycerol ester of fatty acids containing approximately 64% oleic acid, has a calculated HLB value of about 13–16 and is fluid at ambient temperature, as mentioned above.

As with the use of polyoxyethylene (20) mono- and diglycerides of fatty acids, low usage levels of octaglycerol monooleate retarded oiling-off, both following manufacturing and baking.

Increasing the level of usage of the octaglycerol monooleate to approximately 1% totally eliminated oiling-off. At both low and high levels of usage, the imitation cheese had excellent melt properties. Also, the octaglycerol monooleate substantially reduced viscosity during processing, although not as dramatically as the polyoxyethylene (20) mono- and diglycerides of fatty acids.

EXAMPLE 3

In this example, a number of different organic emulsifiers were evaluated in the manufacture of an imitation acid-set mozzarella cheese. The respective products were evaluated, for quality of product following mixing, and for quality of product in the preparation of pizza pie, following baking.

The following cheese formulation was employed:

|  | (%/oz.) |
| --- | --- |
| Water | 45.29 |
| Durkee Code 321 hydrogenated soybean oil | 25.08 |
| Sodium caseinate | 20.40 |
| Calcium caseinate | 5.10 |
| Sodium chloride | 1.70 |
| Calcium chloride | 0.97 |
| Lactic acid | 0.40 |
| Potassium sorbate | 0.13 |
| Color | 0.01 |
| Emulsifier | 0.50–1.00 |

Balance equals 100 by adjusting water.

The procedure for manufacture of the cheese products involved first heating the water to boiling and the oil to 160° F. The emulsifier, sodium chloride and calcium chloride, potassium sorbate and coloring were added to the water. This mixture and the oil were then added to a Littleford Lodge Laboratory Mixer, Model M5G Rei. One-half of the caseinate blend was then added to the Littleford mixer and was mixed for 15 seconds. The remaining caseinate was then added and mixing was continued for one minute further. At this time, all of the lactic acid was added to the mixer, and mixing was further continued for an additional 5 minutes. The mix was then packaged and stored in bricks at 40° F.

In the following Table, the term 8-1-O means octaglycerol monooleate, described above. F-160 is the trademark for a sugar ester manufactured by Dai-Ichikogyo Seiyaku Co., Ltd., Japan. It has an ester composition of about 70% monoester and about 30% di- and tri-ester, and a fatty acid composition of approximately 70% stearic acid and 30% palmitic acid. F-110 is a sugar ester similar to F-160 (same fatty acid composition), except that the ester composition is approximately 50% monoester and 50% di- and tri-ester. F-160 has high hydrophilic properties whereas F-110 has approximately equal hydrophilic and lipophilic properties.

F-50 is a sugar ester similar to F-160 and F-110 (again, same fatty acid composition), except that it has an ester composition of approximately 30% monoester and approximately 70% di- and tri-ester. F-50 has high lipophilic properties.

Durfax 60 was described above and is polyoxyethylene (20) sorbitan monostearate, also known as polysorbate (60). 8-1-S is octaglycerol monostearate, a polyglycerol ester of fatty acids. Emrite 6009 (trademark, Emery Products) is glycerol monooleate (GMO), OW-1570, as mentioned above, is a sugar ester manufactured by Ryoto Company of Japan.

The following Table gives level of usage or percent used based on the weight of the total composition, HLB values for the various emulsifiers, consistency at room temperature, and results obtained.

In the following Table, reference is made to shredding, melt, color and stretch properties. The shredding test was conducted using an ordinary household grater. The term "satisfactory shredding" means that the shredding obtained was comparable to that with natural mozzarella cheese. Satisfactory "melt" was that obtained when the cheese formed a homogeneous mass on the pizza following baking. The "melt" was unsatisfactory when the shreds were still evident, following baking. An unsatisfactory "color" was that obtained from either burning (black spots) or casein separation (white spots). "Stretch" was determined by placing a fork in the melted cheese and pulling away from the melt. Good stretch was experienced if the fork was moved several inches before breaking of the cheese strands. Baking was carried out at 550° for eight (8) minutes.

TABLE

| Emulsifier | (%) Level | Results | Good / Bad X | HLB Value | Consistency at Room Temperature |
|---|---|---|---|---|---|
| 8-1-O (Control) | 1.0 | Good out of mixer. Satis. melt, color, stretch, shredding. | / | 13–16 | fluid |
| 8-1-O | 0.5 | Slightly oily out of mixer. Satis. melt, color, stretch, shredding. | / | 13–16 | fluid |
| F-160 TM sucrose ester, sucrose monostearate having HLB with 70% monoester of about 15 | 1.0 | Very oily out of mixer. Satis. melt and stretch. Unsatis. color and shredding. | X | 15 | solid |
| F-160 | 0.5 | Extremely oily out of mixer. Not evaluated on pizza (NEOP). | X | 15 | solid |
| F-110 50% monoester, HLB 11 | 1.0 | Extremely oily out of mixer. NEOP. | X | 11 | solid |
| F-110 | 0.5 | Extremely oily out of mixer. NEOP. | X | 11 | solid |
| F-50 | 1.0 | Extremely oily out of mixer. NEOP. | X | 6 | solid |
| Durfax 60 TM polyoxyethylene (20) sorbitan monostearate | 1.0 | Slightly sticky. Satis. melt, color, stretch and shredding. | / | 13–15 | semi-fluid pourable |
| 8-1-S octaglycerol monostearate | 1.0 | Good out of mixer (as good as some competitive, not as good as 8-1-O). Satis. melt, stretch, shred. Unsatis. color. | X | 13–16 | solid |
| Emrite 6009 TM (glycerol monooleate, GMO) Emery Ind. | 0.5 | Very slightly oily. Did not flow out of mixer. Satis. shred. Unsatis. stretch, color and melt. | X | 3–5 | fluid |
| OW-1570 TM sucrose monooleate with 70% monoester, HLB 15 | 1.0 | Good out of mixer. Satis. color, stretch and shredding. Unsatis. melt. | X | 15 | fluid |
| OW-1570 | 0.5 | Slightly oily. Satis. melt, color, stretch, shred. | / | 15 | fluid |
| OW-1570 | 1.25 | Good out of mixer. Satis, color, stretch and shred. Unsatis. melt. | X | 15 | fluid |
| No Emulsifier | — | Did not flow out of mixer. Unsatis. shredding, melt and stretch. Satis. color. | X | — | — |

The above results indicate that a high HLB value, and a fluid or at least a semi-fluid or pourable consistency at ambient temperature, are critical properties required of the emulsifier. For instance, the only emulsifiers in the above Table which produced a satisfactory result were octaglycerol monooleate (8-1-O), Durfax 60 (polyoxyethylene (20) sorbitan monostearate) and OW-1570. The octaglycerol monooleate produced good results at both the 0.5 and 1.0 percent levels. The Durfax 60 was used only at the 1.0% level and produced good results. The OW-1570 produced good results at the 0.5% level but not at the 1.0% level. It is possible that conditions at the 1.0% level could have been optimized to produce a satisfactory product, and also at the 1.25% level.

Specifically, the product obtained using octaglycerol monooleate (8-1-O) was good out of the mixer and had satisfactory melt, color, stretch and shredding properties. This emulsifier has a calculated HLB value of 13–16 and is fluid at ambient temperature. By comparison, the F-160 produced a product which was oily out of the mixer. This emulsifier also has a high HLB value, but is a solid at ambient temperature. At the 1.0% level, the melt and stretch properties were satisfactory, but color and shredding properties were unsatisfactory. At the 0.5% level, the product was extremely oily out of the mixer, to the degree that there was no point in evaluating the product on pizza. This is the same for the F-110 and F-50 containing products. F-110 has a high HLB value, whereas that for F-50 is relatively low. Both emulsifiers are solid at ambient temperature.

The Durfax 60 is a semi-fluid or pourable at ambient temperature and has a high HLB value. The product was slightly sticky but otherwise satisfactory out of the mixer and had satisfactory melt, color, stretch and shredding properties. By comparison, octaglycerol monostearate, which is a solid at ambient temperature, produced a product which although good out of the mixer, had unsatisfactory color properties when employed on a pizza. (The product was as good as some competitive products.)

Of the OW-1570 sugar ester series, only the 0.5% level of usage had satisfactory results. As indicated above, conditions probably could be optimized for varying this level. At the higher levels, the product seemed to have unsatisfactory melt properties.

By way of comparison, with no emulsifier, the product did not flow out of the mixer, and had unsatisfactory shredding, melt, stretch, but satisfactory color properties.

The above results were confirmed with other separate tests conducted with certain other emulsifiers. For instance, Emplex (trademark, C. J. Patterson Company), sodium stearoyl-2-lactylate, a fatty acid derived emulsifier having an HLB of about 10, and a solid consistency at ambient temperature, produced a product which had slight oiling and was not acceptable. Similarly, a test conducted with Santone 10-10-0 (trademark, SCM Corp.), a decaglycerol decaoleate polyglycerol ester of fatty acids, having a medium HLB value of about 0–2 but a fluid consistency at ambient temperature, produced substantial oiling and was not acceptable.

It was noted in conducting the tests of the above Table that the acceptable emulsifiers drastically reduced viscosity during mixing in addition to achieving satisfactory melt properties.

The above test data and other observations led to the conclusion that the HLB value of the emulsifier should be at least about 10. Although the level or amount of emulsifier employed, defined as the effective amount useful in the preparation of imitation cheese, can vary over a wide range, optimum results were obtained employing about 0.5–1.5% emulsifier.

It should be noted that one advantage of the present invention is that the procedure for manufacturing is not critical. Preferably, however, mixing takes place at a temperature of about 130°–172° F.

EXAMPLE 4

This example is taken from prior copending application Ser. No. 721,972, filed Sept. 10, 1976, assigned to assignee of the present application. The disclosure of prior application Ser. No. 721,972 is incorporated by reference herein. The following formulation was employed.

| Ingredients | Percent |
|---|---|
| Water | 45.29 |
| Hydrogenated soybean oil (Durkee's 321) | 24.63 |
| Sodium caseinate | 20.40 |
| Calcium caseinate | 5.10 |
| Sodium chloride | 1.70 |
| Octaglycerol monooleate (8-1-0) | 1.00 |
| Calcium chloride | 0.97 |
| Lactic acid | 0.30 |
| Flavor | 0.35 |
| Potassium sorbate | 0.13 |
| Vitamin-Mineral Premix | 0.10 |
| Color | 0.03 |

The specifications for the hydrogenated soybean oil were:
WMP (°F.)—95–98
SFI at 50° F.—39–45
70° F.—22–28
80° F.—20–24
92° F.—4–8
100° F.—3 max.

A homogeneous blend of the dry ingredients (sodium caseinate, calcium caseinate, sodium chloride, calcium chloride, potassium sorbate and vitamin-mineral premix) was placed in a ribbon blender in which it was blended and was introduced into a flow mixer identified as a Readco "Continuous Processor", described as the 5"×36" model, manufactured by Teledyne Readco and disclosed in U.S. Pat. Nos. 3,618,902 and 3,419,250. Water, the emulsifying agent (8-1-O) and color ingredients were added to a water tank and were heated to 175° F. Oil was placed in an oil tank and was heated to 195° F. Lactic acid was placed in a third tank and was maintained at a constant temperature of about 75° F. A flavor tank received the flavor components and was maintained at a constant temperature of about 160° F.

The dry ingredients were introduced into the mixer at a rate of about 56 pounds per hour, and liquid pumps and metering devices were calibrated to introduce the liquid components into the mixer at a rate to provide the percentage of ingredients called for. The liquid materials entered an injection port of the flow mixer in a homogeneous state at a temperature of about 142° F. The flow mixer was provided with a jacket which allowed it to be heated, maintaining a product temperature of about 160° F. within the mixer.

At production rates of 200 and 400 pounds per hour, with r.p.m. of 129, products were obtained that were substantially homogeneous, and which exhibited good shredding properties and also good melt-down properties when employed on a pizza. The melted cheese was stringy and rubbery in nature. On heating, little or no oiling-off or separation of oil from the product was experienced.

Following mixing, the cheese product at a temperature of about 160° F. was transferred by means of a Moyno transfer pump to a homogenizer where it was subjected to homogenization at a temperature of about 140° F. From the homogenizer, the product was pumped to a swept wall heat exchanger (a "C Votator" Unit manufactured by Chemetron Corporation). The extruded product from the swept wall heat exchanger was then packaged and stored at about 40° F. until ready for use.

What is claimed is:

1. A method for the preparation of an imitation high-moisture acid-set mozzarella cheese characterized as being sufficiently hard to be grated and having the stretch, flavor, melt-down, and browning characteristics of natural mozzarella cheese, comprising the steps of
   (a) preparing a formulation consisting essentially of
      about 15–35% edible protein of which at least 40% is sodium caseinate,
      about 15–30% low melting point hydrogenated vegetable oil,
      about 0.5–1.0% calcium ion providing substance,
      about 0.5–1.5% organic emulsifying agent,
      about 0.2–3% edible acid, and
      about 45–53% water,
   said vegetable oil having a Wiley Melting Point of about 60°–120° F. said emulsifying agent having an HLB value of more than about 10 and a fluid consistency at ambient temperature,
   (b) adding said formulation to a mixing zone and subjecting said formulation to mixing at a temperature in the range of about 130°–172° F.; and
   (c) removing the mixed product from said zone and cooling it until a hardened product is obtained.
   (d) said organic emulsifying agent being selected from the group consisting of polyglycerol oleate ester having a hydroxyl value of about 400 to 600, a saponification number of about 60 to 100, and acid values of less than about 10; polyoxyethylene (20) sorbitan monoester of fatty acid; a sugar ester which is sucrose monooleate with about 70% monoester; and polyoxyethylene (20) mono- and diglycerides of fatty acids.

2. The method of claim 1 wherein said calcium ion providing substance is calcium chloride.

3. The method of claim 1 wherein said acid is lactic acid.

4. The method of claim 1 wherein said protein is about 70–100% sodium caseinate.

5. The method of claim 5 wherein said acid provides a formulation pH of about 4.5–6.

6. An imitation high-moisture acid-set mozzarella cheese prepared by the method of claim 1.

* * * * *